March 3, 1959     H. NAGEL ET AL     2,876,067
HEAT-SHRINKABLE FILM
Filed Sept. 9, 1955
COATING OF POLYETHYLENE CONTAINING
ADHESION PROMOTER.
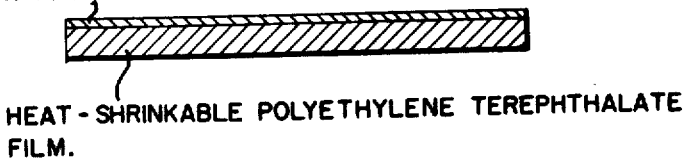
HEAT-SHRINKABLE POLYETHYLENE TEREPHTHALATE
FILM.
INVENTORS
HERBERT NAGEL
LAWRENCE ROY HATT
BY
ATTORNEY

2,876,067
HEAT-SHRINKABLE FILM

Herbert Nagel and Lawrence Roy Hatt, Wilmington, Del., assignors to E. I. du Pont de Nemours and Company, Wilmington, Del., a corporation of Delaware Application September 9, 1955, Serial No. 533,516

9 Claims. (Cl. 117—138.8)

This invention relates to heat-shrinkable polyethylene terephthalate film and, more particularly, to heat-shrinkable, heat-sealable, coated polyethylene terephthalate film having a low initial moisture-permeability value.

Heat-shrinkable polyethylene terephthalate films are those which have been oriented by stretching and/or rolling an amorphous polyethylene terephthalate film in one or two directions, i. e., directions mutually perpendicular, without heat-setting the resultant oriented films. In other words, the heat-shrinkable film will tend to revert back to its original dimensions upon exposure to temperatures in excess of about 70° C. In the normal preparation of an oriented film whose dimensions are substantially stable at elevated temperatures, the oriented film is heat-set by exposing the film to an elevated temperature within the range from 150°–250° C. while holding the film under tension, i. e., restraining any change in the dimensions of the film, until it has been cooled to a temperature below 100°–150° C. Heat-shrinkable polyethylene terephthalate film may be employed in a large variety of tight wrapping applications such as the packaging of fresh and frozen poultry, large cuts and slices of red meats, smoked hams, frozen fish, and various similar food products, particularly those of irregular shapes. This film is highly advantageous because of its outstanding degree of transparency, surface gloss, and high shrinkage force (shrinkage force is a measure of the ability of the shrinking film to shrink against a force which tends to prevent shrinkage).

Heat-shrinkable polyetheylene terephthalate film, however, is difficult to heat seal. Furthermore, for many packaging applications, particularly for those wherein frozen food is to be stored for a long period of time, the moisture vapor-transmission (expressed as initial permeability value (IPV) in terms of moisture vapor transmitted through 100 square meters of film per hour) is too high, particularly when the heat-shrinkable film is employed in thicknesses ranging from 0.5 to 1.5 mils, this being the thickness range most useful for general heat-shrinkable packaging applications.

An object of the present invention, therefore, is to provide a heat-shrinkable polyethylene terephthalate film which is readily heat-sealable. A further object is to provide a heat-shrinkable polyethylene terephthalate film having a reduced permeability to the passage of water vapor. Other objects will be apparent from the following description of this invention.

The above objects are accomplished in accordance with the present invention by providing a heat-shrinkable (non-heat-set) polyethylene terephthalate film with an adherent continuous coating comprising essentially a major proportion of polyethylene and at least 1% by weight, based on the total weight of solids in the coating, of an adhesion promoter from the group consisting of natural rubber, cyclized natural rubber, and elastoprenes; the coating composition being applied at a temperature not in excess of 70° C.

The present invention resides in the discovery that a physical mixture of a polyethylene and an adhesion promoter in the form of a rubbery material of the type described hereinabove, adheres strongly to the heat-shrinkable polyethylene terephthalate film, and the degree of adhesiveness and the elasticity of the coating composition is such that the film is capable of shrinking with substantially no change in its original appearance, i. e., no change in the smooth surface of the coated film. The coated film is readily heat-sealable; furthermore, the moisture vapor-permeability of the coated film is reduced below that of the uncoated film, and the moisture vapor-permeability of the shrunken coated film is less than that of the coated film prior to shrinkage.

While the present coatings will be described hereinafter as being applied to heat-shrinkable polyethylene terephthalate film, it should be understood that the coatings may be readily applied to heat-shrinkable films from polyethylene terephthalates which have been modified with small amounts of acids or esters thereof, from the group consisting of isophthalic acid, bibenzoic acid, sebacic acid, adipic acid, and hexahydro-terephthalic acid. The production of polyethylene terephthalate is fully described in U. S. Patent 2,465,319 to Whinfield and Dickson. From a commercial standpoint, the most attractive process for the production of polyethylene terephthalate comprises carrying out an ester interchange between ethylene glycol and dimethyl terephthalate to form bis-2-hydroxy ethyl terephthalate which is polymerized to polyethylene terephthalate under reduced pressure and at elevated temperatures. In such a reaction, various modified polyethylene terephthalates may be formed by reacting ethylene glycol, dimethyl terephthalate, and a small quantity, e. g., 10–15% of a low alkyl ester of one of the acids mentioned above.

As employed herein, the term "heat-shrinkable polyethylene terephthalate film" refers to non-heat-set film which has been oriented in one or two directions, i. e., mutually perpendicular directions by stretching or by rolling, or by combinations of stretching, then rolling, i. e., stretching in one direction followed by rolling in a direction perpendicular thereto.

For most packaging applications, i. e., for tight wrapping of articles in the heat-shrinkable films or bags fabricated therefrom, the film has usually been oriented in both directions to substantially the same extent, e. g., stretched 3X in both directions. In practically all cases, the film will shrink to a greater extent in the last direction of orientation. In other words, in the case of the film stretched 3X (where X equals the original dimension of the film) in the machine direction (MD) and thereafter stretched 3X in the transverse direction (TD) the film will shrink to a greater extent in the transverse direction. On the average, a polyethylene terephthalate film stretched 3X in both directions (the TD being the last direction of stretch) will shrink about 25% in the MD, and about 50% in the TD. In other types of uses, for example, when the heat-shrinkable film is to be converted into heat-shrinkable bands to be employed as secondary closures for beverages and other types of bottled food products, the heat-shrinkable film is preferably one which has been stretched in one direction, for example, 2X in one direction, as described and claimed in copending application, U. S. Serial No. 366,627, now Patent No. 2,784,456, filed July 7, 1953, in the name of T. A. Grabenstein. In all cases, however, the heat-shrinkable films of the present invention are those which have been oriented but not heat-set.

Polyethylene, which constitutes the major constituent of the coating of this invention, is the normally solid, crystalline polymer of the formula $(CH_2)_x$, and is formed by the polymerization of ethylene in known manner.

A preferred cyclized natural rubber is "Pliolite" NR, a product of the Goodyear Tire & Rubber Company. It is prepared by treating natural rubber with stannic chloride or chlorostannic acid. The chemical structure is defined in "Rubber Age," April 1939.

When used in this application, "elastoprene" refers to derivatives of butadiene, normally containing a major proportion of butadiene, as defined in H. L. Fisher's article, "Nomenclature of Synthetic Rubbers," 'Industrial and Engineering Chemistry, volume 31, page 941 (1939), and includes butadiene rubbers, piperylene rubbers, isoprene rubbers, dimethyl butadiene rubbers and haloprene rubbers. A preferred elastoprene is "Hycar" 1552, which is a butadiene/acrylonitrile copolymer containing 60–70% butadiene and manufactured by the B. F. Goodrich Chemical Company. Another elastoprene particularly suited for purposes of this invention is a butadiene/styrene copolymer containing 70% of styrene, by weight, of the total weight of the two components ("Pliolite S–7" Type 30, also a product of the Goodyear Tire & Rubber Company).

The polyethylene coatings of the present invention are preferably applied from solutions in volatile organic solvents although they may be applied from aqueous dispersions. In all cases, however, the coating itself must not exceed about 75° C. in temperature, and the drying of the coated film must be carried out at a temperature not in excess of about 75° C. Higher temperatures will promote incipient film shrinkage and are definitely to be avoided. From a practical standpoint with respect to the time required for carrying out coating of the present heat-shrinkable polyethylene terephthalate film, it is preferred to apply the coatings from a solvent solution because the solvent may be more rapidly evolved from the film at temperatures not exceeding 75° C.

Preparation of the polyethylene/adhesive promoter coating compositions may be exemplified by the preparation of a polyethylene/cyclized rubber coating which is most easily prepared by dissolving the solids, i. e., polyethylene and the cyclized rubber, in a common volatile organic solvent, e. g., toluene or a mixture of solvents. The polyethylene should comprise from 99% to 90%, by weight of the solids content of the coating composition, and the rubber and/or the resin component should comprise from 1% to 10% of the solids content of the composition. Concentrations of the rubber and/or elastoprene component in excess of about 10% may be employed, but quantities in excess of 10% usually result in producing a cloudy coating. If less than 1% is used, the adhesion is poor and the advantageous results of this invention are not realized. It is to be understood, of course, that any other suitable method for combining the essential ingredients of the composition may be employed, such as melt mixing, milling, dispersing in aqueous medium (water), etc. The coatings may be applied on one or both sides of the heat-shrinkable polyethylene terephthalate film by dipping, spraying, or any other convenient coating technique. The accompanying drawing is a view in cross-section illustrating heat-shrinkable polyethylene terephthalate film coated on one side with a continuous film of polyethylene containing an adhesion promoter in accordance with the present invention.

In a specific embodiment of this invention, a base film of heat-shrinkable polyethylene terephthalate (1 mil in thickness), i. e., stretched 3X its original dimensions in two directions and not heat-set, was coated by dipping it into the following solution:

Parts by weight
"Alathon" D polyethylene resin manufactured by the E. I. du Pont Company_____ 20
Butadiene/styrene copolymer containing 70% styrene ("Pliolite" S–7 Type 30)_____ 3
Toluene _____ 200

The above solution was placed in a coating trough having a glass rod immersed in the solution and mounted across the trough and separated from the bottom of the trough. The film was conducted into the coating trough under the glass rod, and thereafter between two offset doctor rolls in the form of glass rods which served to remove excess coating from the film surface. The coating solution was originally mixed together and maintained at about 80° C. to dissolve the polymers. During the coating operation the coating solution was maintained at a temperature between 65°–75° C. The film was then dried in air at room temperature. When the coatings appeared to be superficially dry, the coated film was dried in a hot air oven at 65°–70° C. for about 5 minutes.

In the following table (Table I) the properties of the resulting coated film are compared to those of uncoated film.

TABLE I

| Film | Permeability Before Shrinkage (gms./100 m.²/hr.) | Permeability After Shrinkage [1] (gms./100 m.²/hr.) | Original Dimensions | | Dimensions After Shrinkage | |
|---|---|---|---|---|---|---|
| | | | MD (cm.) | TD (cm.) | MD (cm.) | TD (cm.) |
| Uncoated | 151 | 66 | 10.0 | 5.0 | 7.1 | 2.5 |
| Coated | 146 | 57 | 10.0 | 5.0 | 7.5 | 2.6 |

[1] Shrinkage effected at 100° C. in water for 5 seconds.

The details of the methods of testing the coated film follow:

Moisture permeability is determined by placing the test film over the top of an aluminum cup containing 15 milliliters of water, the test area being 33.3 square centimeters. The assembly is weighed accurately and then placed in a drive (less than 3% relative humidity) air-swept oven at 39.5° C. for 24 hours. The assembly is removed from the oven, cooled at room temperature and reweighed. The weight loss is converted to grams of water lost/100 square meters/hour.

Heat-seal strength is measured by cutting strips of the film 1½" in width by 4" in length. The length of these strips runs perpendicular to the "grain" or machine direction of the film. Two strips are then sealed together, the seal running with the transverse direction of the film, with a Precision Sealer (hot bar type sealer) having a sealing bar 4½" in length and a width of ⅝" (seal width was equal to ⅝"). The sealing pressure is varied at 5, 10, 20 and 40 p. s. i. and the sealing temperature is varied at 90° C., 100° C., 105° C. and 115° C. The seal strength is then measured by placing the free ends of the seal strips in a Suter testing machine and pulling them apart. The highest force in grams required to pull the strips apart is taken as the measure of the heat seal bond strength.

Shrinkage patterns are determined by immersing strips of film completely in the water at 100° C. for 5 seconds. For measuring the degree of shrinkage in the machine direction a strip of film 1" x 6" was used, the length of this film running in the machine direction. A distance of 10 centimeters (cm.) was marked along the length of the film, and two open-mouth clips were clamped across the width of this film at the extremities of the 10 centimeter length. This film was then immersed in boiling water (100° C.) and the amount of shrinkage after 5 seconds was noted. For film stretched 3X in both directions, the average MD shrinkage is about 25%. For testing the TD shrinkage a strip of film 1" x 4" was used, the length of this film running in the TD. A distance of 5 centimeters was marked along the TD direction and this film was also clamped at the extremities of this 5 centimeter length. After immersion in boiling water for 5 seconds, the shrinkage was noted. On the average for biaxially stretched (3X) film, the TD shrinkage (the TD being the last direction of stretch) was about 50%.

As a control example, 20 parts of polyethylene ("Alathon" D manufactured by E. I. du Pont Company) were dissolved in 200 parts of toluene at about 80° C. A heat-shrinkable polyethylene terephthalate film (1 mil in thickness), stretched 3X its original dimensions in two directions (non-heat-set), was coated by dipping it into this solution in accordance with the same procedure described hereinbefore. After drying this film, it was flexed by hand and the coating tended to flake off. In addition, the heat-seal bond strength was extremely low (seals made at 105° C.).

In another specific embodiment of the present invention, a base of heat-shrinkable polyethylene terephthalate film (1 mil in thickness) stretched 3 times (3X) its original dimensions in two directions (non-heat-set), was coated in a manner similar to that described hereinbefore by dipping it into a solution comprising 95 parts of crystalline polyethylene and 5 parts of cyclized natural rubber ("Pliolite" NR) in 734 parts of toluene at a temperature of about 70° C. The solution was originally prepared by holding the solvent at a temperature of about 100° C. until a homogeneous solution was formed. The coated film was then dried in air at room temperature, and when the coating appeared to be superficially dry, the coated film was finally dried in a hot air oven at 65°–75° C. for about 5 minutes. The adhesion of coating to film was found to be excellent.

In the following tables (Tables II and III) the properties of the resulting film are compared to those of uncoated film.

TABLE II

| Film | Permeability Before Shrinkage (gms./100 m.²/hr.) | Permeability After Shrinkage¹ (gms./100 m.²/hr.) | Original Dimensions | | Dimensions After Shrinkage | |
|---|---|---|---|---|---|---|
| | | | MD (cm.) | TD (cm.) | MD (cm.) | TD (cm.) |
| Uncoated | 151 | 66 | 10.0 | 5.0 | 7.1 | 2.5 |
| Coated | 98 | 50 | 10.0 | 5.0 | 7.5 | 2.6 |

¹ Shrinkage effected at 100° C. in water for 5 seconds.

TABLE III

*Heat-seal strength (average of 5 seals) (dwell time—2 seconds)*

| Film | Heat-Seal Bar Temperature (° C.) | Heat-Seal Pressure (p. s. i.) | Seal Strength (gms./1.5″) |
|---|---|---|---|
| Uncoated | 115 | 40 | 0 (no seal) |
| Coated | 90 | 10 | 70 |
| Do | 90 | 20 | 300 |
| Do | 90 | 40 | 320 |
| Do | 100 | 5 | 300 |
| Do | 100 | 10 | 490 |
| Do | 100 | 20 | 460 |
| Do | 100 | 40 | 400 |
| Do | 105 | 5 | 600 |
| Do | 105 | 10 | 470 |
| Do | 105 | 20 | 550 |
| Do | 105 | 40 | 530 |
| Do | 115 | 5 | 590 |
| Do | 115 | 10 | 540 |
| Do | 115 | 20 | 430 |
| Do | 115 | 40 | 509 |

In still another specific embodiment of the present invention, a base film of heat-shrinkable polyethylene terephthalate film (1 mil in thickness) stretched 3X its original dimensions in two directions (non-heat-set) was coated in a manner similar to that described hereinbefore by dipping it into a solution comprising 95 parts of crystalline polyethylene and 5 parts of a butadiene/acrylonitrile rubber (elastoprene) containing 60–70% butadiene ("Hycar" 1552 manufactured by the B. F. Goodrich Chemical Company). The polymers were dissolved in about 730 parts of toluene at a temperature of about 100° C., and the solution was mixed at this temperature until the polymers dissolved. The coating was carried out while the solution was maintained at about 70° C. The coated film was then dried in air at room temperature, and when the coating appeared to be superficially dry, it was finally dried in a hot air oven at 65°–75° C. for about 5 minutes. The adhesion of coating to film was found to be excellent.

In the following table (Table IV) the properties of the resulting film are compared to those of uncoated film.

TABLE IV

| Film | Permeability Before Shrinkage (gms./100 m.²/hr.) | Permeability After Shrinkage¹ (gms./100 m.²/hr.) | Original Dimensions | | Dimensions After Shrinkage | |
|---|---|---|---|---|---|---|
| | | | MD (cm.) | TD (cm.) | MD (cm.) | TD (cm.) |
| Uncoated | 151 | 66 | 10.0 | 5.0 | 7.1 | 2.5 |
| Coated | 96 | 48 | 10.0 | 5.0 | 7.4 | 2.5 |

¹ Shrinkage effected at 100° C. in water for 5 seconds.

The base polyethylene terephthalate films of the present invention are shrinkable by exposure to temperatures in excess of about 70°–75° C. It is preferred, however, to shrink the film at temperatures within the range of 90°–100° C. in order to obtain optimum shrinkage in a minimum time. It should be mentioned that the polyethylene coating tends to reduce slightly the total shrinkage in both directions below that of an uncoated film, and the amount by which the shrinkage is reduced is mainly dependent upon the coating thickness. Thicker coatings will tend to reduce the overall degree of shrinkage to a greater extent than thinner coatings. From a practical standpoint, the coating thicknesses in most cases need not be greater than about 0.1–0.5 mil, but thinner or thicker coatings may be used if the end use requires coatings of a special thickness.

The coated films of the present invention exhibit reasonably high gloss and clarity provided that the amount of the rubbery adhesion promoter is maintained below 10%, by weight, based upon the total weight of solids in the coating composition. Furthermore, these coated, heat-shrinkable films are readily heat-sealable and have reduced permeability to moisture vapor. These films find their greatest outlets in the field of food packaging. For example, the heat-shrinkable polyethylene terephthalate films of the present invention having thicknesses ranging from about 0.25 mil up to 10 mils may be employed for wrapping frozen poultry, frozen fruits, frozen vegetables, fresh poultry, large cuts and slices of red meats, smoked hams, frozen fish and various similar food products.

The present heat-shrinkable sheets, envelopes, or tubes, etc., may be employed in wrapping other articles besides food, for example, items of hardware, greased or untreated machine parts, and in packaging other materials which must be kept substantially free from moisture vapor. In general, these heat-shrinkable films may be applied in multiple packaging of various items, for example, for packaging individual servings of loose items, for example, crackers, nuts, cereals, etc. Furthermore, heat-shrinkable sheets or tubes may be employed in various bundling applications, for example, as a means of holding together a multiplicity of packages of cigarettes, small boxes of cereals, crackers, and various food items which are packaged similarly.

We claim:

1. Heat-shrinkable polyethylene terephthalate film having an adhere continuous coating consisting essentially of a major proportion of polyethylene and from 1% to 10% by weight, based on the total weight of solids in the coating, of an adhesion promoter selected from the group consisting of natural rubber, cyclized natural rubber, and elastoprenes.

2. Heat-shrinkable polyethylene terephthalate film having an adherent continuous coating consisting of from 99–90%, by weight, of polyethylene, and from 1% to 10%, by weight, of an adhesion promoter selected from the group consisting of natural rubber, cyclized natural rubber, and elastoprenes.

3. The product of claim 2 wherein the adhesion promoter is a copolymer of butadiene and styrene containing 70% styrene.

4. The product of claim 2 wherein the adhesion promoter is cyclized natural rubber.

5. The process which comprises coating heat-shrinkable polyethylene terephthalate film at a temperature not in excess of 75° C. with a composition consisting essentially of a major proportion of polyethylene and from 1% to 10% by weight, based on the total weight of solids in the composition, of an adhesion promoter selected from the group consisting of natural rubber, cyclized natural rubber, and elastoprenes, contained in a liquid medium, and thereafter drying said coated film at a temperature not in excess of 75° C.

6. The process which comprises coating heat-shrinkable polyethylene terephthalate film at a temperature not in excess of 75° C. with a composition consisting essentially of a major proportion of polyethylene and from 1% to 10%, by weight, based on the total weight of solids in the composition, of an adhesion promoter selected from the group consisting of natural rubber, cyclized natural rubber, and elastoprenes, dissolved in a volatile organic solvent for polyethylene and said adhesion promoter, and thereafter drying said coated film at a temperature not in excess of 75° C.

7. The process according to claim 4 wherein said composition contains from 99–90%, by weight, based on the total weight of solids in said composition, of polyethylene, and from 1% to 10%, by weight, of said adhesion promoter.

8. The process according to claim 7 wherein said adhesion promoter is a copolymer of butadiene and styrene containing 70% styrene.

9. The process according to claim 7 wherein said adhesion promoter is cyclized natural rubber.

References Cited in the file of this patent

UNITED STATES PATENTS

| | | |
|---|---|---|
| 2,340,452 | Child et al. | Feb. 1, 1944 |
| 2,369,471 | Lathom | Feb. 13, 1945 |
| 2,628,172 | Jenett | Feb. 10, 1953 |
| 2,656,297 | Davis et al. | Oct. 20, 1953 |
| 2,673,826 | Ness | Mar. 30, 1954 |
| 2,678,285 | Browning | May 11, 1954 |

UNITED STATES PATENT OFFICE
CERTIFICATE OF CORRECTION

Patent No. 2,876,067                                                                  March 3, 1959

Herbert Nagel et al.

It is hereby certified that error appears in the printed specification of the above numbered patent requiring correction and that the said Letters Patent should read as corrected below.

Column 5, line 63, TABLE III, under the heading "Seal Strength (gms./1 last numeral thereof, for "509" read -- 590 --; column 6, line 70, for "adh" read -- adherent --.

Signed and sealed this 22nd day of September 1959.

(SEAL)
Attest:

KARL H. AXLINE                                                          ROBERT C. WATSON
Attesting Officer                                                    Commissioner of Patents